UNITED STATES PATENT OFFICE.

GEORGE H. BRABROOK, OF BOSTON, MASSACHUSETTS, ASSIGNOR OF ONE-HALF TO ALBERT T. FLETCHER, OF BOSTON, MASSACHUSETTS.

ADHESIVE.

1,244,463.  Specification of Letters Patent.  Patented Oct. 30, 1917.

No Drawing.  Application filed April 1, 1916.  Serial No. 88,219.

*To all whom it may concern:*

Be it known that I, GEORGE H. BRABROOK, a citizen of the United States, residing at Boston, in the county of Suffolk and State of Massachusetts, have invented new and useful Improvements in Adhesives, of which the following is a specification.

This invention has relation to adhesives, and has for its object to provide an adhesive which is practically moisture- or water-repellent, and which thus may be employed, for example, in making veneers for use in the construction of aeroplane bodies.

Generally speaking, the invention consists of an adhesive resulting from the treatment of casein with a solution of cupraammonium, which I have found to be of great tenacity and equal in adhesiveness to the best hide glues, if not superior thereto.

In practice, I may mix powdered casein and water to form a rather thin gruel, and then add thereto about five per cent. of cupraammonium. If the amount of cupraammonium is insufficient to effect a complete solution of the casein, add more of the cupraammonium solution. I may employ commercial casein, that containing the least amount of fat being best for the purpose, and commercial cupraammonium.

The casein and cupraammonium solution may be prepared at atmospheric temperatures, but, if the mass is heated to a temperature of say 150° F., the solution of the casein is expedited. The resultant product may be used while hot, or, if desired, it may be diluted with water and allowed to cool before using. By holding the temperature not over 150° F., there is much less tendency of the solution to scum over. A vessel made or lined with copper helps to keep limpid the solution therein made or stored, the same result being achieved with the presence of a piece of metallic copper in the solution. The solution could also be prepared by adding casein to strong aqua-ammonia, with the subsequent addition of copper or copper salts, such as oxid of copper, but this procedure I should regard as equivalent to that first herein described.

The strength of the adhesive may be increased by first heating the casein before it is dissolved. To this end, the casein may be boiled in water until it becomes tacky and "strings" when a portion is lifted from the body of the mass. The water on cooling may be separated by stirring and decanted. This process may be repeated until all soluble impurities in the casein are washed away. The resulting product is then dissolved by the addition of water and the desired amount of cupraammonium. An adhesive thus made is highly tenacious on setting, and is somewhat less affected by moisture than one prepared as herein first described. While each adhesive, after long continued soaking, loses its adhesive qualities, it is able to withstand ordinary moisture.

I am able to increase the moisture- and water-repellent qualities of my adhesive by adding to either of the solutions hereinbefore described from two to four per cent. of methyl alcohol, and then a small quantity— say less than one per cent.—of formalin. This product gives the best results if used while in a heated condition. To prepare a water-repellent adhesive to be used when cold, a small quantity of freshly made lime water may be added to and thoroughly mixed with the casein-cupraammonium solution, these substances being cold when added together. Or, if desired, casein, lime water and cupraammonium may be ground in a pug mill, adding such excess of cupraammonium from time to time, or to the completed mixture, as judgment may dictate, to produce the best results. Let it be remembered, however, that for some woods, the lime has a staining effect, and consequently the smallest possible amount of lime should be used, in order to mitigate this effect. This solution must be used cold.

When laminæ are coated with this adhesive to form a veneer, the latter may be left in press to set in the cold, or it may be pressed in hot plates, in which latter case the adhesive will set in from ten to twenty minutes on the application of a moderate heat.

A compound, as herein described, may be used for a variety of purposes, and for various commercial products, where glue and gelatin are ordinarily employed. Horny and amorphous masses may be formed for commercial purposes, by the addition to the solution of suitable fillers.

A solution of casein in a saturated solution of cupraammonium makes a thick syrup, which dries to a hard enamel resembling vulcanized rubber or Japanese lacquer. Such material is not soluble in water though it will gradually soften therein. Under certain circumstances, it makes a substitute for japans.

What I claim is:

1. As a new article of manufacture, a product comprising in its formation a solution of casein and cupraammonium.

2. An adhesive comprising an aqueous solution of casein and cupraammonium.

3. An adhesive comprising a solution of casein, cupraammonium and a substance which added thereto increases the water-repellent qualities.

4. An adhesive comprising a solution of casein, cupraammonium and lime water.

5. The herein described process of making an adhesive which consists in dissolving casein in cupraammonium.

6. The herein described process of making an adhesive which consists in heating casein and then dissolving the same in cupraammonium.

In testimony whereof I have affixed my signature.

GEORGE H. BRABROOK.